United States Patent [19]

Berchtold et al.

[11] Patent Number: 4,747,727

[45] Date of Patent: May 31, 1988

[54] ANCHOR ROD ASSEMBLY SECURED BY HARDENABLE MASS

[75] Inventors: Oliver Berchtold, Grabs; Alfred Tobler, Ruggell, both of Switzerland

[73] Assignee: Hilti Aktiengesellschaft

[21] Appl. No.: 65,365

[22] Filed: Jun. 23, 1987

[30] Foreign Application Priority Data

Jun. 23, 1986 [DE] Fed. Rep. of Germany ....... 3620972

[51] Int. Cl.$^4$ .............................................. E21D 20/02
[52] U.S. Cl. ..................................... 405/260; 52/704; 405/261
[58] Field of Search ............... 405/260, 261, 259, 244; 52/698, 704, 706, 707; 411/82, 965

[56] References Cited

U.S. PATENT DOCUMENTS

| | | | |
|---|---|---|---|
| 3,298,144 | 1/1967 | Fischer | 405/261 X |
| 4,092,814 | 6/1978 | Kern | 405/260 X |
| 4,167,359 | 9/1979 | Beveridge | 405/259 |
| 4,518,290 | 5/1985 | Frichmann et al. | 405/261 X |
| 4,664,555 | 5/1987 | Herbst | 405/260 |
| 4,679,966 | 7/1987 | Yacisin | 405/261 |

FOREIGN PATENT DOCUMENTS

| | | | |
|---|---|---|---|
| 3039080 | 4/1982 | Fed. Rep. of Germany | 405/260 |
| 0779011 | 7/1957 | United Kingdom | 405/260 |
| 2084630 | 4/1982 | United Kingdom | 405/261 |
| 0929864 | 5/1982 | U.S.S.R. | 405/260 |

Primary Examiner—Dennis L. Taylor
Attorney, Agent, or Firm—Toren, McGeady & Associates

[57] ABSTRACT

An anchor rod assembly includes an axially elongated anchor rod to be secured in a borehole by a hardenable mass inserted into the borehole around the anchor rod. The anchor rod is divided by slots into a plurality of circumferentially spaced axially extending segments extending from the leading end of the anchor rod. The anchor rod has an axially extending central bore located radially inwardly of the segments. A filler piece is inserted into the central bore and the slots between the segments. The filler piece closes off the slots between the segments at the outer circumferential surface of the anchor rod. Due to the filler piece, the hardenable mass cannot flow into the slots between the segments and the central bore. As a result, the segments follow movement of the borehole wall during any widening of the borehole because of cracked development, and the anchor rod is retained in the borehole. A radially inwardly formed constriction in the outer circumferential surface of the segments adjacent the trailing end of the anchor rod improves deformability of the segments.

11 Claims, 2 Drawing Sheets

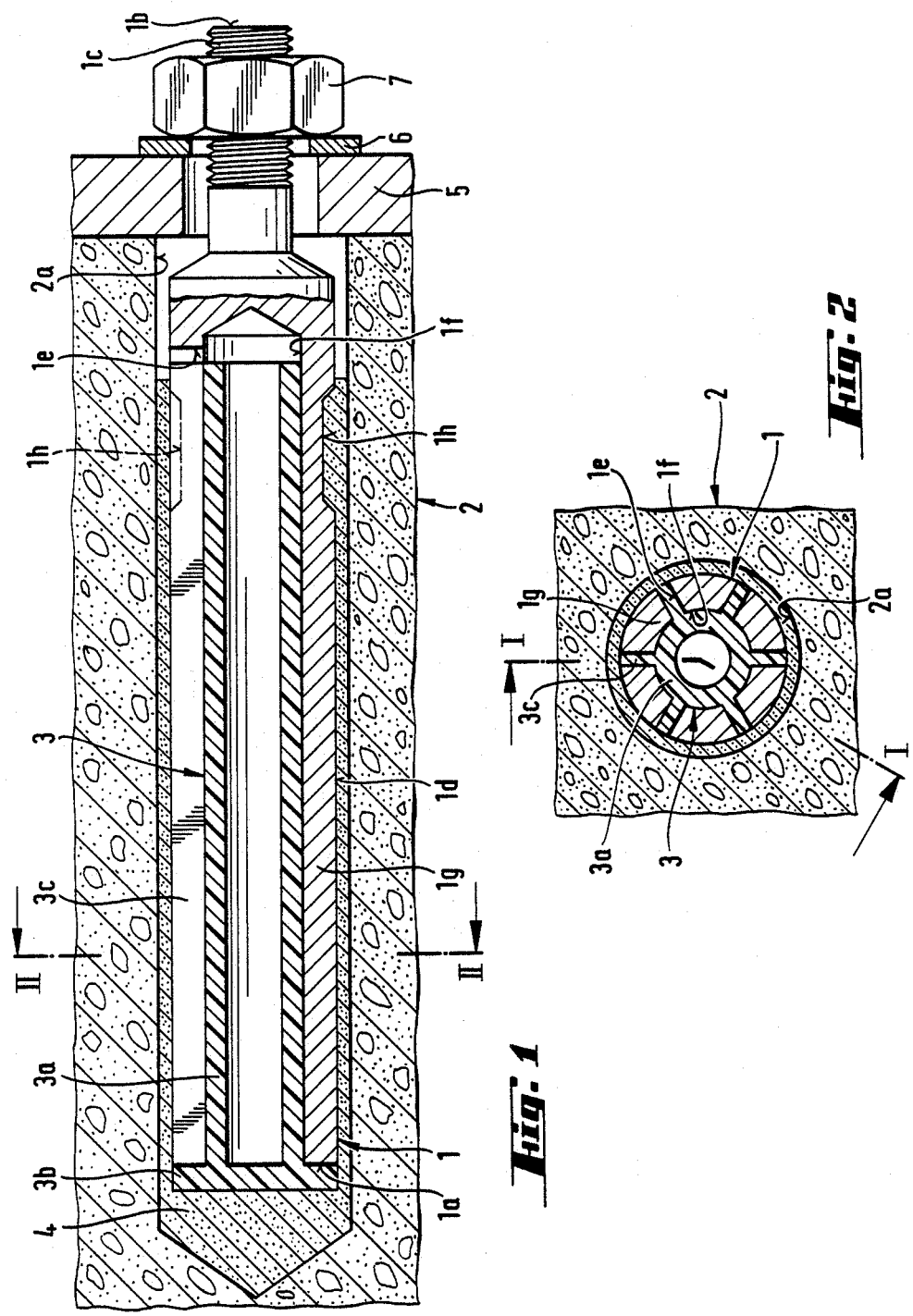

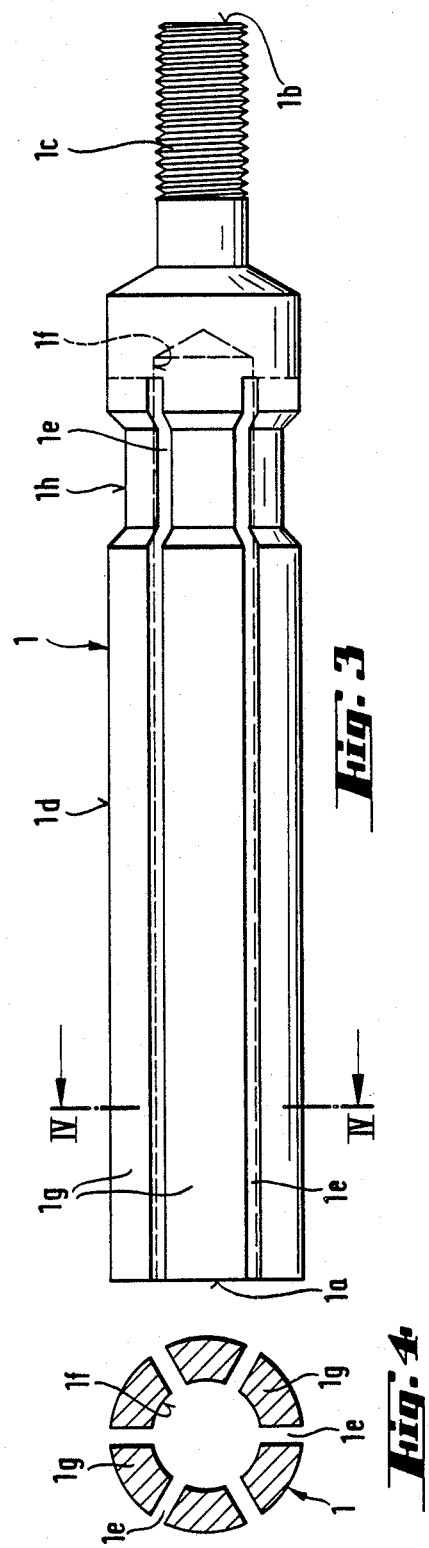
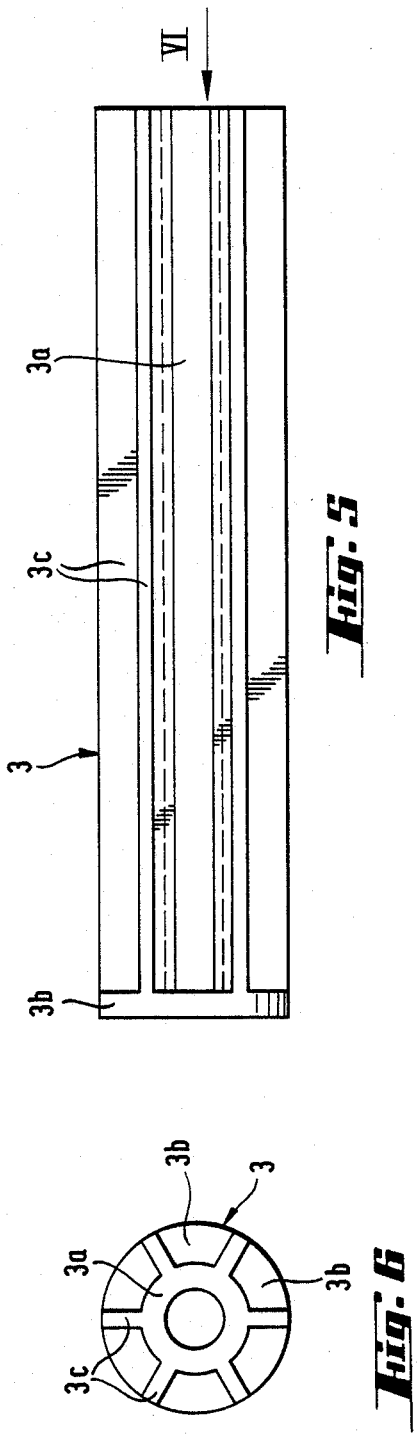

ANCHOR ROD ASSEMBLY SECURED BY HARDENABLE MASS

BACKGROUND OF THE INVENTION

The present invention is directed to an anchor rod assembly for securing an axially extending anchor rod by means of a hardenable mass in a borehole formed in a structure or receiving material. The anchor rod is arranged to carry a load at one end and has an attachment region extending from the other end made up of a number of segments.

Attachment devices including anchor rods securable by a hardenable mass are used in many instances because they have a high extraction value, no expansion pressure, good chemical resistance, and are not affected by considerable tolerance deviations in the borehole diameter.

Such attachment devices, characterized generally as bonding or composite anchors, have in the past displayed the disadvantage, as compared to so-called expansion dowel assemblies, that in a cracked or fractured structure, or in a region prone to cracking, such devices have not been used for safety reasons. If a crack extends through a borehole, then the bond between the anchor rod and the hardenable mass, or between the hardenable mass and the borehole wall, is broken and the attachment device may fall out.

SUMMARY OF THE INVENTION

Therefore, it is the primary object of the present invention to provide an anchor rod assembly securable in a borehole by a hardenable mass which is suitable for use in regions of a structure prone to the development of cracks.

In accordance with the present invention, the anchor rod assembly includes a filler piece for closing intermediate slots or spaces between axially extending segments formed in the anchor rod, particularly forming a closure of the slots on the outer circumferential surface of the anchor rod.

With the filler piece inserted into the anchor rod, the penetration of the hardenable mass into the slots between the segments of the anchor rod is prevented. Moreover, the filler piece not only blocks the openings into the individual slots at the circumferential surface of the anchor rod, it also can form a closure for the open leading end of the anchor rod, inserted first into the borehole during installation.

By closing off the slots between the segments, the bonding of the anchor rod with the borehole surface occurs only in the region of the segments. The bonding layer formed by the hardenable mass between the anchor rod and the borehole surface does not extend around the entire circumferential periphery of the anchor rod, but only across the segments bounded by the slots. If a crack runs through the borehole, in the event the crack opens, the bonding of the anchor rod with the borehole surface remains effective. As a result, the crack extends in the region of the borehole through the slots or intermediate spaces between the segments forming the anchor rod.

The filler piece can be formed as a single unit or as a number of parts and can completely fill the slots or be located only at the outer circumferential surfaces of the segments defining the slots. As an example, the filler piece can be formed separately and inserted into the slots. Further, it would be possible to fill the slots by immersing the anchor rod into a liquified mass. In such an embodiment, the liquified mass adhering to the outer circumferential surface of the attachment region of the anchor rod can subsequently be removed or the adherence of the liquified mass can be prevented by a prior treatment of the circumferential surface, whereby bonding is effected between the anchor rod and the hardenable mass during the installation procedure.

When the anchor rod assembly is being installed, the filler piece is subjected to minor loads. For reasons of economy and fabrication, it is preferable that at least a portion of the filler piece is made of plastics. The filler piece formed of plastics material can be manufactured separately and inserted into the slots or it can be fabricated directly within the slots.

To prevent bonding of the filler piece with the anchor rod by the hardenable mass in the event a gap exists between the filler piece and the anchor rod segments, it is preferable that the filler piece is formed, at least in part, of a plastics material which does not bond with the hardenable mass. An example of such a plastics material is the aldehyde polymers known under the trade name DELRIN.

In another preferred embodiment, the filler piece is provided at least partially with a coating that does not bond with the hardenable mass. It would be possible to form the filler piece of metal or another suitable material. The coating could be applied to the surface of the filler piece in a spray process or by immersion.

For improved adaptation of the anchor rod to a structure, possibly interspersed by cracks, preferably the anchor rod has an axially extending central bore radially inwardly of the segments and communicating with the slots between the segments. The central bore extends at least for a portion of the axial length of the slots or spaces between the segments. To prevent any flow of the hardenable mass into the central bore, the opening into the bore at the leading end of the anchor rod can be closed off by the filler piece.

The opening of a crack in the structure can amount to several tenths of a millimeter up to one millimeter. To permit the anchor rod to follow such movement in the manner of pliers, it is appropriate to provide a cross-sectional constriction in the outer circumferential surface of the anchor rod with the constriction at least partially located in the region of the slots. Preferably, the constriction is located in the attachment region of the anchor rod closer to the trailing end of the rod on which a load is attached. Such a constriction can be formed by turning the anchor rod on a lathe so that the outer circumferential surface is machined or cut away, or the constriction could be formed in the central bore within the anchor rod. The constriction constitutes a bending location for the individual segments located between the intermediate spaces.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of an anchor rod assembly embodying the present invention secured by a hardenable mass within a borehole with the section taken along the line I—I in FIG. 2;

FIG. 2 is a cross-sectional view through the anchor rod assembly taken along the line II—II in FIG. 1;

FIG. 3 is an axially extending view of the anchor rod shown in FIGS. 1 and 2;

FIG. 4 a cross-sectional view through the anchor rod taken along the line IV—IV in FIG. 3;

FIG. 5 is an axially extending view of the filler piece of the anchor rod assembly illustrated in FIG. 1; and FIG. 6 is an end view of the filler piece viewed in the direction of the arrow VI in FIG. 5.

DETAILED DESCRIPTION OF THE INVENTION

In FIG. 1, an anchor rod assembly is shown inserted into a borehole 2a in a structure or receiving material 2. The anchor rod assembly includes an axially extending anchor rod 1, an axially extending filler piece 3 and a hardenable mass 4 within the borehole surrounding the outer circumferential surface of the anchor rod. The anchor rod 1 is illustrated in FIG. 3 and the filler piece 3 in FIG. 5.

The axially extending anchor rod 1 has a leading end 1a inserted first into the borehole 2a, and a trailing end 1b located outwardly from the borehole. The part of the anchor rod 1 projecting outwardly from the borehole has a reduced diameter as compared to attachment region 1d extending from the leading end 1a toward the trailing end 1b. The reduced diameter part of the anchor rod 1 has a thread 1c extending from the trailing end toward the attachment region 1d. Attachment region 1d is axially elongated and is divided by axially and radially extending slots 1e, and has an axially extending central bore 1f, extending from the leading end 1a to adjacent the trailing end of the attachment region 1d. As can be seen in FIG. 4, the slots 1e terminate adjacent the trailing end of the bore 1f, closer to the leading end 1a of the anchor rod, with the slots dividing the attachment region 1d into a plurality of individual axially extending and radially deformable segments 1g. An annular and axially extending constriction 1h is formed in the outer circumferentially surface of the anchor rod 1, closely adjacent the trailing ends of the slots 1e for enhancing the deformability of the individual segments 1g.

In FIGS. 1 and 2, the anchor rod assembly is inserted into the borehole 2a in the structure 2 with filler piece 3 inserted into the central bore 1f within the anchor rod 1. As can be seen in FIG. 2, filler piece 3 includes an axially extending sleeve 3a, a flange 3b, located at the leading end of the filler piece, and axially and radially extending ribs 3c corresponding and complementary to the axially extending slots 1e. The ribs 3c project radially outwardly from the outer surface of the sleeve 3a to the circumferential outer surface of the anchor rod 1. In addition, the flange 3b located at the leading end of the sleeve 3a, forms a closure over the leading end of the bore 1f within the anchor rod. As can be seen in FIG. 1 and 2, an annular gap is present between the outer circumferential surface of the attachment region 1d of the anchor rod 1, and the surface of the borehole 2a. The annular gap is filled with a hardenable mass 4, so that the mass fills the borehole from its base to adjacent the opening into the borehole. With the filler piece 3 inserted into the central bore 1f and the axially extending slots 1e, flow of the hardenable mass into the central bore and the slots is prevented. This feature assures the radial expandability of the attachment region 1d of the anchor bolt 1. If a crack develops in the structure 2, and extends through the borehole 2a, then, as a practical matter, the crack can also extend through the anchor rod itself. If the borehole 2a widens because cracks open up, the axially extending segments 1g of the anchor rod remain bonded to the borehole surface. Accordingly, displacement of the anchor rod out of the borehole is prevented.

As shown in FIG. 1, the anchor rod 1 secures a plate 5 to the surface of the structure 2. By locating a washer 6 between the plate 5 and a nut 7, by tightening the nut on the thread 1c, the plate can be pressed against the structure 2, after the mass 4 has hardened.

In FIGS. 5 and 6, the filler piece 3 is illustrated. Filler piece 3 includes the axially extending sleeve 3a, the flange 3b at the leading end of the sleeve, and the axially and radially extending ribs, preferably all formed from a plastics material. To prevent bonding of the hardenable mass 4 with the filler piece 3, it is preferable to use a plastics material which does not bond with the hardenable mass. An aldehyde polymer, known under the trade name DELRIN is suitable for this purpose. It would also be possible to place a coating on at least portions of the filler piece 3 so that it does not bond with the hardenable mass.

In place of a separate filler piece 3, the slots 1e in the anchor rod 1 can be filled with a material that does not bond with the hardenable mass.

While specific embodiments of the invention have been shown and described in detail to illustrate the application of the inventive principles, it will be understood that the invention may be embodied otherwise without departing from such principles.

We claim:

1. Anchor rod assembly, including an axially elongated anchor rod having an outer axially extending circumferential surface and arranged to be secured in a borehole formed in a receiving material by introducing a hardenable mass into the borehole around the anchor rod, said anchor rod having a leading end inserted first into the borehole and a trailing end arranged to be positioned outwardly from the borehole, means adjacent the trailing end of said anchor rod for attaching a load on the trailing end, said anchor rod including an axially extending attachment region extending from the leading end toward the trailing end and arranged to be located within the borehole, said attachment region comprising a plurality of axially extending segments, wherein the improvement comprises that said segments are spaced apart in the circumferential direction of said anchor rod forming slots between adjacent said segments with said slots extending radially inwardly from said outer circumferential surface, and means located in said slots between adjacent said segments for forming a closure of said slots at the outer circumferential surface.

2. Anchor rod assembly, as set forth in claim 1, wherein said closure forming means comprising an axially extending filler piece having an outer circumferential surface corresponding to the outer circumferential surface of said anchor rod.

3. Anchor rod assembly, as set forth in claim 2, wherein said filler piece is formed at least partially of a plastics material.

4. Anchor rod assembly, as set forth in claim 2, wherein said filler piece is formed at least partially of a plastics material which does not bond with the hardenable mass.

5. Anchor rod assembly, as set forth in claim 4, wherein said plastics material is an aldehyde polymer.

6. Anchor rod assembly, as set forth in claim 1, wherein said closure forming means comprises a filler piece having an outer circumferential surface corresponding to the outer circumferential surface of said anchor rod and being formed of a material with a coating at least partially covering the material with the coating being incapable of forming a bond with the hardenable mass.

7. Anchor rod assembly, as set forth in claim 1, wherein said anchor rod includes an axially extending central bore located inwardly of said segments.

8. Anchor rod assembly, as set forth in claim 7, wherein an annular constriction is formed in the outer circumferential surface of said segments adjacent to the end of said segments closer to the trailing end of said anchor rod.

9. Anchor rod assembly, as set forth in claim 1, wherein said means comprising a filler piece, said filler piece comprising an axially extending sleeve, a plurality of ribs extending axially along and radially outwardly from the outer surface of said sleeve, with said ribs corresponding to said slots in said anchor rod.

10. Anchor rod assembly, as set forth in claim 9, wherein said anchor rod comprises an axially extending central bore, said sleeve of said filler piece located within said central bore with the outer circumferential surface of said sleeve in contact with the surface of the central bore, and said ribs on said sleeve extending radially outwardly through said slots to the outer circumferential surface of said anchor rod.

11. Anchor rod assembly, as set forth in claim 10, wherein a trailing end part of said anchor rod extends from the trailing end of the attachment region to the trailing end of said anchor rod, said attachment region having a larger diameter than said trailing end part, said means for attaching a load comprising a thread formed on said trailing part and extending from the trailing end of said anchor rod toward the trailing end of said attachment section.

* * * * *